United States Patent
Mukherjee et al.

(10) Patent No.: US 9,870,328 B2
(45) Date of Patent: *Jan. 16, 2018

(54) MANAGING BUFFERED COMMUNICATION BETWEEN CORES

(71) Applicant: Cavium, Inc., San Jose, CA (US)

(72) Inventors: Shubhendu Sekhar Mukherjee, Southborough, MA (US); David Asher, Sutton, MA (US); Bradley Dobbie, Cambridge, MA (US); Thomas Hummel, Holliston, MA (US); Daniel Dever, North Brookfield, MA (US)

(73) Assignee: CAVIUM, INC., San Jose, CA (US)

( * ) Notice: Subject to any disclaimer, the term of this patent is extended or adjusted under 35 U.S.C. 154(b) by 453 days.

This patent is subject to a terminal disclaimer.

(21) Appl. No.: 14/542,118

(22) Filed: Nov. 14, 2014

(65) Prior Publication Data

US 2016/0140061 A1    May 19, 2016

(51) Int. Cl.
*G06F 13/16* (2006.01)
*G06F 13/42* (2006.01)
(Continued)

(52) U.S. Cl.
CPC ...... *G06F 13/1673* (2013.01); *G06F 12/0815* (2013.01); *G06F 12/1009* (2013.01);
(Continued)

(58) Field of Classification Search
None
See application file for complete search history.

(56) References Cited

U.S. PATENT DOCUMENTS 5,437,017 A * 7/1995 Moore ............... G06F 12/1027
                                                              709/213
5,644,742 A * 7/1997 Shen ................... G06F 9/3004
                                                              712/244
(Continued)

FOREIGN PATENT DOCUMENTS

EP          0592121 A1 *  4/1994  ......... G06F 12/1027

OTHER PUBLICATIONS

'NUMA-Aware Shared-Memory Collective Communication for MPI' by Li et al.*
(Continued)

*Primary Examiner* — Steven Snyder
(74) *Attorney, Agent, or Firm* — Occhiuti & Rohlicek LLP

(57) ABSTRACT

Communicating among multiple sets of multiples cores includes: buffering messages in first buffer associated with a first set of multiple cores; buffering messages in a second buffer associated with a second set of multiple cores; and transferring messages over communication circuitry from cores not in the first set to the first buffer, and to transferring messages from cores not in the second set to the second buffer. A first core of the first set sends messages corresponding to multiple types of instructions to a second core of the second set through the communication circuitry. The second buffer is large enough to store a maximum number of instructions of a second type that are allowed to be outstanding from cores in the first set at the same time, and still have enough storage space for one or more instructions of a first type.

12 Claims, 12 Drawing Sheets

(51) Int. Cl.
*G06F 13/40* (2006.01)
*G06F 12/10* (2016.01)
*G06F 12/1027* (2016.01)
*G06F 12/1009* (2016.01)
*G06F 12/0815* (2016.01)

(52) U.S. Cl.
CPC ........ *G06F 12/1027* (2013.01); *G06F 13/404* (2013.01); *G06F 13/4234* (2013.01); *G06F 2212/50* (2013.01); *G06F 2212/60* (2013.01); *G06F 2212/65* (2013.01); *G06F 2212/68* (2013.01); *G06F 2212/683* (2013.01)

(56) References Cited

U.S. PATENT DOCUMENTS

| | | | |
|---|---|---|---|
| 5,906,001 A | 5/1999 | Wu et al. | |
| 5,909,698 A * | 6/1999 | Arimilli | G06F 12/0808 711/141 |
| 6,119,204 A | 9/2000 | Chang | |
| 6,182,165 B1 | 1/2001 | Spilo | |
| 6,199,154 B1 * | 3/2001 | Witt | G06F 9/30021 711/122 |
| 6,272,604 B1 * | 8/2001 | Nunez | G06F 12/0831 711/144 |
| 7,073,043 B2 | 7/2006 | Arimilli et al. | |
| 7,600,080 B1 * | 10/2009 | Bhattacharyya | G06F 12/0817 711/118 |
| 7,600,217 B2 | 10/2009 | Dostert et al. | |
| 7,617,378 B2 | 11/2009 | Arimilli et al. | |
| 7,853,754 B1 | 12/2010 | Agarwal et al. | |
| 7,865,670 B2 | 1/2011 | Cota-Robles et al. | |
| 7,882,307 B1 * | 2/2011 | Wentzlaff | G06F 12/0813 711/119 |
| 8,015,388 B1 | 9/2011 | Rihan | |
| 8,190,960 B1 | 5/2012 | Bahadur et al. | |
| 8,392,661 B1 | 3/2013 | Metcalf | |
| 8,521,963 B1 * | 8/2013 | Miao | G06F 12/10 711/120 |
| 8,539,155 B1 * | 9/2013 | Miao | G06F 12/10 711/120 |
| 8,769,036 B2 | 7/2014 | Frey et al. | |
| 8,799,914 B1 * | 8/2014 | Metcalf | G06F 12/10 712/10 |
| 8,832,381 B2 | 9/2014 | Hunt | |
| 8,904,118 B2 * | 12/2014 | Mamidala | G06F 12/0831 711/147 |
| 8,990,514 B2 * | 3/2015 | Mamidala | G06F 12/0831 711/147 |
| 9,229,865 B2 * | 1/2016 | Solihin | G06F 12/0811 |
| 9,405,700 B2 * | 8/2016 | Wingard | G06F 12/1027 |
| 9,514,050 B1 * | 12/2016 | Agarwal | G06F 12/0811 |
| 9,524,232 B2 * | 12/2016 | Bhattacharjee | G06F 12/0215 |
| 9,600,413 B2 | 3/2017 | Ray et al. | |
| 9,740,617 B2 * | 8/2017 | Sury | G06F 12/0833 |
| 2003/0229741 A1 * | 12/2003 | Stuber | G06F 13/423 710/110 |
| 2004/0215897 A1 * | 10/2004 | Arimilli | G06F 12/1027 711/144 |
| 2004/0215898 A1 * | 10/2004 | Arimilli | G06F 12/1027 711/144 |
| 2006/0010299 A1 * | 1/2006 | Zhang | H04L 67/1097 711/162 |
| 2007/0070074 A1 * | 3/2007 | Jiang | G09G 5/399 345/539 |
| 2007/0180156 A1 * | 8/2007 | Irish | G06F 12/1009 710/5 |
| 2011/0016289 A1 | 1/2011 | Ableidinger | |
| 2012/0117301 A1 * | 5/2012 | Wingard | G06F 12/1027 711/6 |
| 2012/0179879 A1 * | 7/2012 | Mamidala | G06F 12/0831 711/147 |
| 2013/0007278 A1 * | 1/2013 | Srinivasan | H04W 4/005 709/225 |
| 2013/0151782 A1 * | 6/2013 | Liu | G06F 12/0831 711/130 |
| 2013/0290667 A1 * | 10/2013 | Dixit | G06F 9/5016 711/173 |
| 2014/0006689 A1 | 1/2014 | Hashimoto et al. | |
| 2014/0112339 A1 * | 4/2014 | Safranek | G06F 12/0831 370/389 |
| 2014/0115268 A1 * | 4/2014 | Beers | G06F 12/0828 711/146 |
| 2014/0164732 A1 * | 6/2014 | Muff | G06F 12/1027 711/207 |
| 2014/0189285 A1 | 7/2014 | Conrad | |
| 2014/0237185 A1 * | 8/2014 | Solihin | G06F 12/0811 711/119 |
| 2015/0006805 A1 | 1/2015 | Feekes | |
| 2015/0032971 A1 | 1/2015 | Tian | |
| 2015/0058592 A1 * | 2/2015 | Bhattacharjee | G06F 12/0215 711/205 |
| 2015/0089150 A1 | 3/2015 | Kessler | |
| 2015/0100753 A1 * | 4/2015 | Shen | G06F 12/1027 711/207 |
| 2015/0134931 A1 | 5/2015 | Mukherjee et al. | |
| 2015/0178204 A1 | 6/2015 | Ray et al. | |
| 2015/0186068 A1 * | 7/2015 | Benisty | G06F 3/0673 711/154 |
| 2015/0186191 A1 * | 7/2015 | Fahim | G06F 9/524 711/140 |
| 2015/0205728 A1 * | 7/2015 | Bennett | G06F 12/1009 711/103 |
| 2016/0140047 A1 | 5/2016 | Mukherjee et al. | |
| 2016/0140060 A1 | 5/2016 | Mukherjee et al. | |
| 2016/0179674 A1 * | 6/2016 | Sury | G06F 12/0833 711/141 |
| 2016/0188474 A1 * | 6/2016 | Wang | G06F 12/0842 711/119 |

OTHER PUBLICATIONS

'CPU Cache Flushing Fallacy' Mechanical Sympathy, Feb. 14, 2013.*
'QuickPath Interconnect: Rules of the Revolution' by Robert J. Safranek and Michelle J. Moravan, Nov. 4, 2009.*
'Application Note Multiprocessor Systems and the PowerPC 603e Microprocessor,' Freescale Semiconductor, Inc., 2004.*
IBM Technical Disclosure Bulletin NN9405249 'Use of the SYNC Instruction to Synchronize Completion of Translation Look-aside Buffer Invalidate in a Multi-Processor System,' May 1, 1994.*

* cited by examiner

MANAGING BUFFERED COMMUNICATION BETWEEN CORES

BACKGROUND

This invention relates to management of communication between integrated circuits in a computing system.

Many computing systems include motherboards having multiple sockets, each of which can have an integrated processor circuit, including one or more processing cores, inserted therein. When necessary the integrated processor circuits can communicate with one another over one or more communications channels between the sockets.

SUMMARY

In one aspect, in general, an apparatus includes: a first set of multiple cores; a first buffer associated with the first set; a second set of multiple cores; a second buffer associated with a second set; communication circuitry configured to transfer messages from cores not in the first set to the first buffer, and to transfer messages from cores not in the second set to the second buffer; and wherein a first core of the first set is configured to send messages corresponding to multiple types of instructions to a second core of the second set through the communication circuitry, where at least one first type of instruction corresponds to a first operation that is performed by the second core without requiring any instructions to be transmitted through the communication circuitry to complete the first operation, and at least one second type of instruction corresponds to a second operation that is performed by the second core requiring at least one message to be transmitted through the communication circuitry to complete the second operation; and wherein the buffer of the second set is large enough to store a maximum number of instructions of the second type that are allowed to be outstanding from cores in the first set at the same time, and still have enough storage space for one or more instructions of the first type.

Aspects can include one or more of the following features.

The first type of instruction includes a first instruction that corresponds to an operation that invalidates a virtual address stored in a translation lookaside buffer.

The first type of instruction includes a second instruction that corresponds to an operation that requests data to be written by a particular core.

The second instruction is performed for requesting that data associated with a virtual address being invalidated and is stored in one core is to be written to a physical address by another core.

The second type of instruction includes a third instruction that requests acknowledgement from each core that previous messages corresponding to the first instruction have been completed.

Completing at least one message corresponding to the first instruction requires sending at least one message corresponding to the second instruction.

The message to be transmitted through the communication circuitry to complete the second operation comprises an acknowledgement associated with an instruction of the first type.

The instruction of the first type was initiated in response to the second operation.

In another aspect, in general, a method for communicating among multiple sets of multiples cores includes: buffering messages in first buffer associated with a first set of multiple cores; buffering messages in a second buffer associated with a second set of multiple cores; and transferring messages over communication circuitry from cores not in the first set to the first buffer, and to transferring messages from cores not in the second set to the second buffer; wherein a first core of the first set sends messages corresponding to multiple types of instructions to a second core of the second set through the communication circuitry, where at least one first type of instruction corresponds to a first operation that is performed by the second core without requiring any instructions to be transmitted through the communication circuitry to complete the first operation, and at least one second type of instruction corresponds to a second operation that is performed by the second core requiring at least one message to be transmitted through the communication circuitry to complete the second operation; and wherein the second buffer is large enough to store a maximum number of instructions of the second type that are allowed to be outstanding from cores in the first set at the same time, and still have enough storage space for one or more instructions of the first type.

Aspects can include one or more of the following features.

The first type of instruction includes a first instruction that corresponds to an operation that invalidates a virtual address stored in a translation lookaside buffer.

The first type of instruction includes a second instruction that corresponds to an operation that requests data to be written by a particular core.

The second instruction is performed for requesting that data associated with a virtual address being invalidated and is stored in one core is to be written to a physical address by another core.

The second type of instruction includes a third instruction that requests acknowledgement from each core that previous messages corresponding to the first to instruction have been completed.

Completing at least one message corresponding to the first instruction requires sending at least one message corresponding to the second instruction.

The message to be transmitted through the communication circuitry to complete the second operation comprises an acknowledgement associated with an instruction of the first type.

The instruction of the first type was initiated in response to the second operation.

Aspects can have one or more of the following advantages. Among other advantages, aspects described herein avoid deadlock on communications channels between integrated processor circuits in two or more sockets by including buffers in each of the integrated circuits that reserve one or more slots for messages that are guaranteed to make forward progress.

Other features and advantages of the invention will become apparent from the following description, and from the claims.

DESCRIPTION

Figure 1:
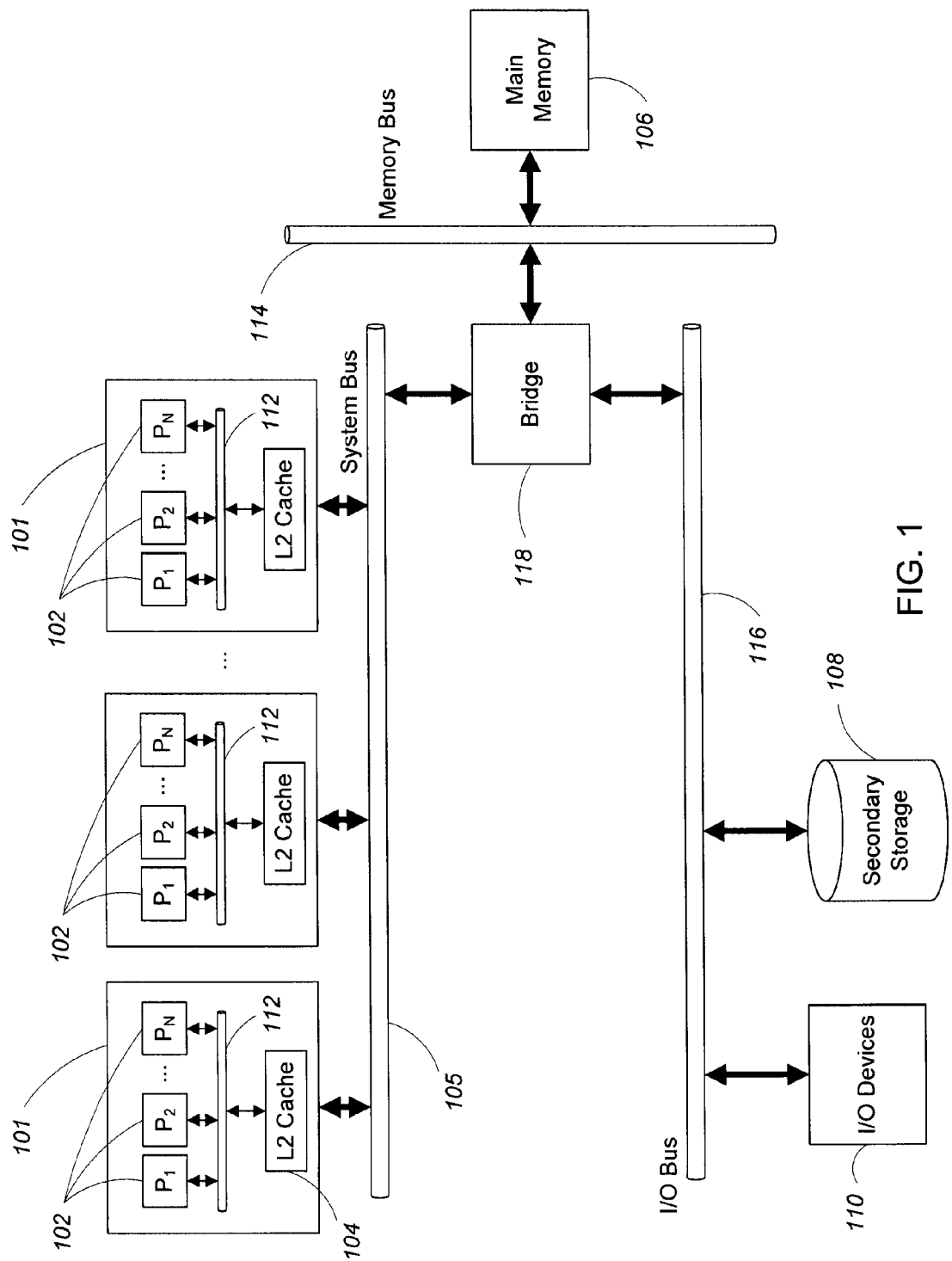
FIG. 1 is a computing system.

Referring to FIG. 1, a computing system 100 includes a number of sockets 101, each including an integrated circuit including a number of processing elements 102, and a level 2 (L2) cache 104 (e.g., SRAM). The processing elements 102 included in the integrated circuit in a given socket are in communication with one another and the L2 cache 104 over a processing bus 112. The computing system also includes a main memory 106 (e.g., DRAM), a secondary storage device (e.g., a magnetic disk) 108, and one or more input/output (I/O) devices 110 (e.g., a keyboard or a mouse). The sockets 101 are connected to a system bus 105, the main memory 106 is connected to a memory bus 114, and the I/O devices 110 and the secondary storage device 108 are connected to an I/O bus 116. The processing bus 112, the memory bus 114, and the I/O bus 116 are connected to one another via a bridge 118.

As is described in greater detail below, each integrated circuit in the sockets 101 includes a message buffer for receiving messages from other integrated circuits in other sockets 101 via the system bus 105. In some examples, the system bus 105 includes communication circuitry which establishes a shared communication channel for transferring messages between the buffers of the integrated circuits.

Various types of messages can be transferred between the buffers of the integrated circuits over the shared channel. Two types of messages commonly used in approaches described herein are synchronization messages and memory write messages. Very generally, when a given processing element sends a synchronization message, the given processing element halts its processing until it receives an acknowledgement that all of the processing elements that the synchronization message was sent to (both in its local socket and on any other, remote sockets) have performed an operation to synchronize some or all of their translation lookaside buffers with the translation lookaside buffer of the given processing element. This type of synchronization operation is described in greater detail in co-pending U.S. patent application Ser. No. 14/514,498 entitled "TRANSLATION LOOKASIDE BUFFER MANAGEMENT," filed on Nov. 14, 2014, which is incorporated herein by reference.

In some examples, when a processing element receives a synchronization message from another processing element, the synchronization message causes the processing element to perform an operation to flush its write buffer. When the processing element flushes its write buffer, a memory write message may be transferred over the shared communication channel from the processing element to another, different processing element 102 of an integrated circuit in a different socket 101.

Figure 2:
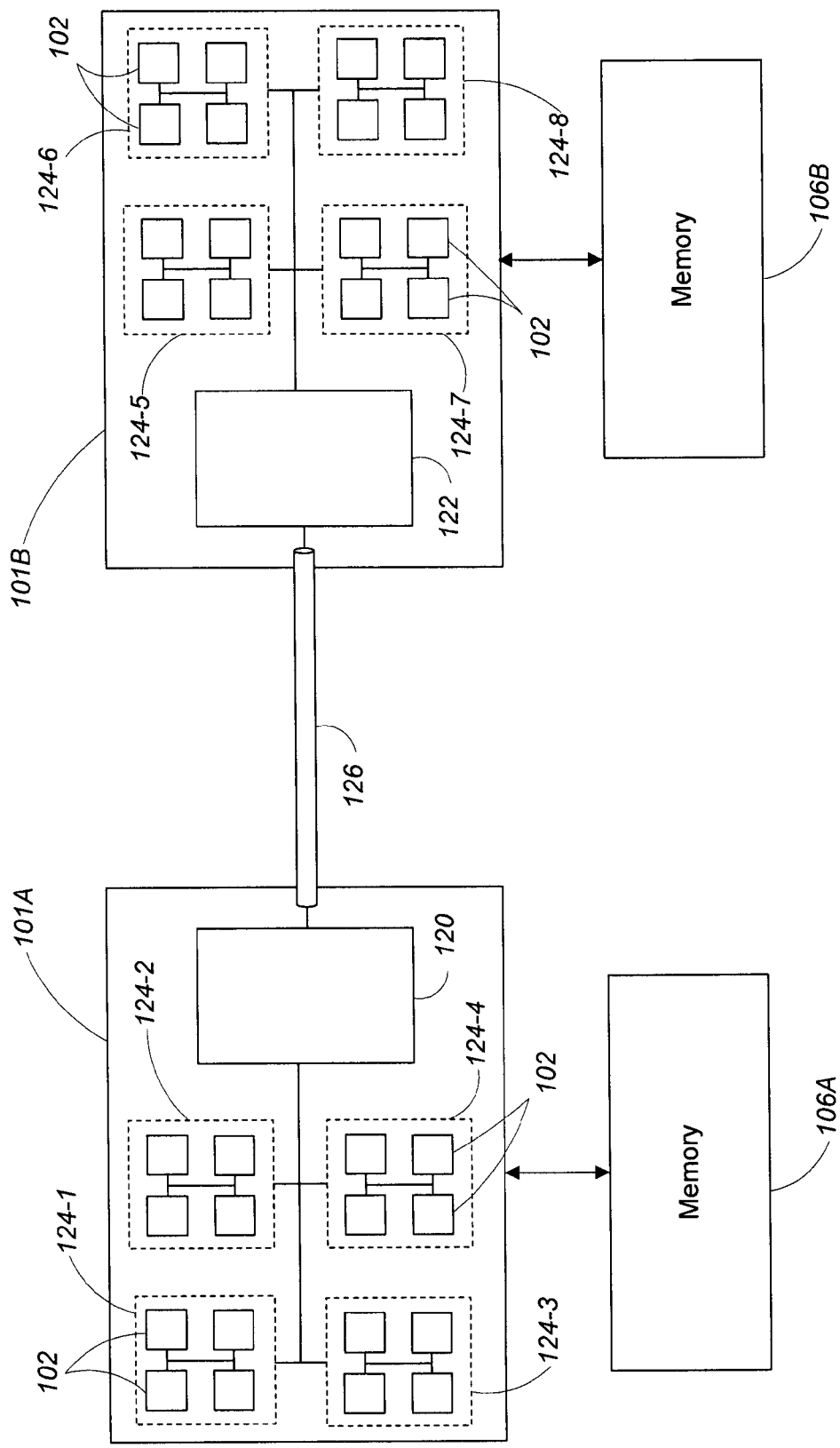
FIG. 2 is a simplified view of the computing system of FIG. 1 including a communication channel between integrated circuits in two sockets.

Referring to FIG. 2, a simplified version of the computing system of FIG. 1 includes two sockets: a first socket 101A and a second socket 101B. The first socket 101A and the second socket 101B can communicate with one another via a shared communication channel 126. Each of the sockets 101A, 101B is also coupled to a respective memory 106A, 106B.

The first socket 101A includes a first message buffer 120 and four subsets of processing elements 102: a first subset of processing elements 124-1, a second subset of processing elements 124-2, a third subset of processing elements 124-3, and a fourth subset of processing element 124-4. The subsets of processing elements and the first message buffer 120 are in communication over an interconnect. In this example, the first message buffer 120 includes four slots for messages.

The second socket 101B includes a second message buffer 122 and four subsets of processing elements 102: a fifth subset of processing elements 124-5, a sixth subset of processing elements 124-6, a seventh subset of processing elements 124-7, and an eight subset of processing elements 124-8. The subsets of processing elements and the second message buffer 122 are in communication over an interconnect. In this example, the second message buffer includes four slots for messages.

1 Deadlock

Figure 3:
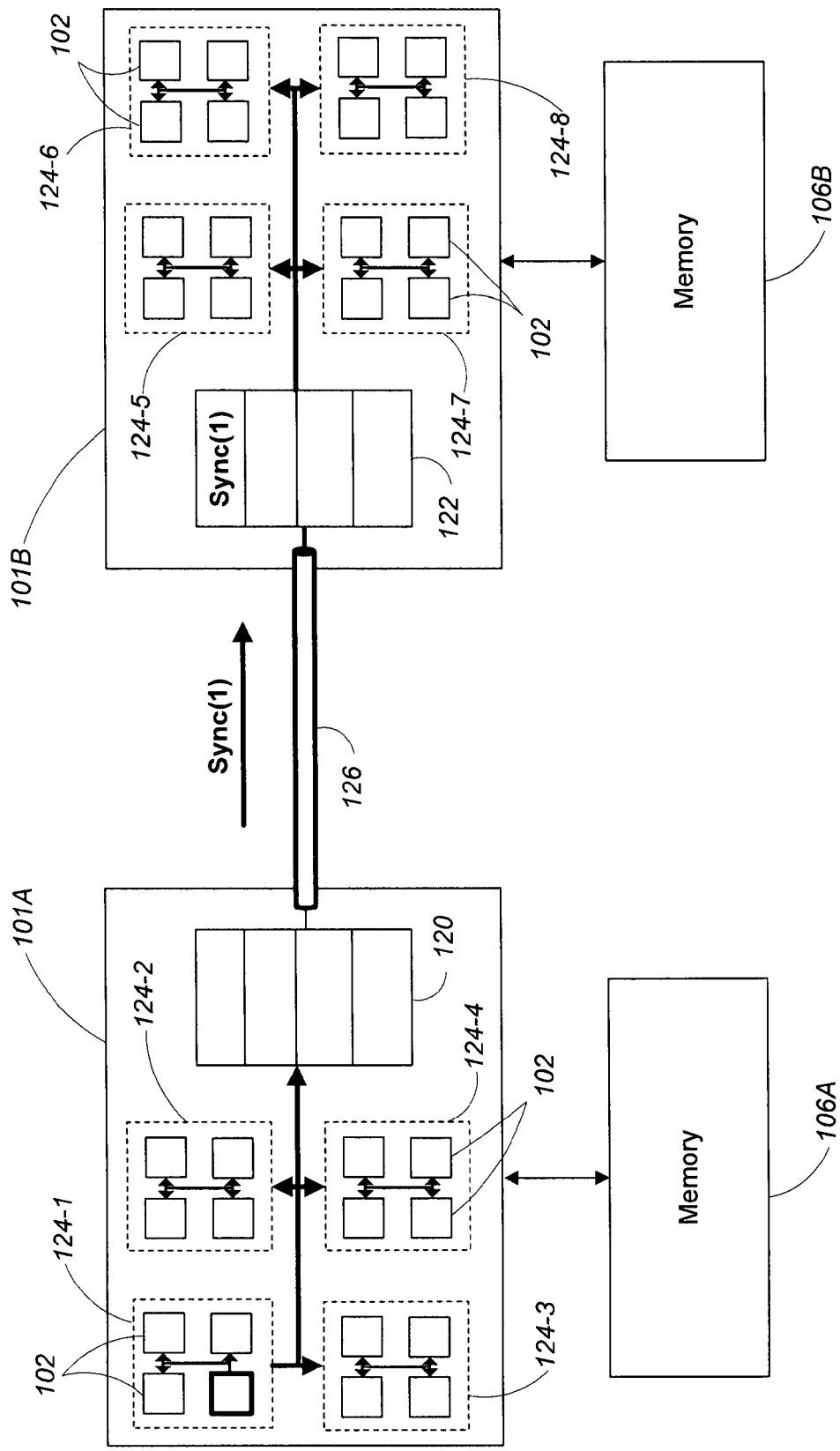
FIG. 3 shows a first synchronization message being sent over the communication channel.

FIGS. 3-6 illustrate a sequence of messages that can be sent over the communication channel 126 to cause deadlock in a certain configuration of the computing system. Referring to FIG. 3, a processing element 102 of the first subset of processing elements 124-1 sends a first synchronization message, Sync(1), to all of the processing elements 102 in the subsets of processing elements in the first socket 101A. The first synchronization message is also sent over the communication channel 126 to the second socket 101B. At the second socket 101B, the first synchronization message is added to the second message buffer 122 and is sent to the processing elements 102 of the subsets of processing elements in the second socket 101B.

Figure 4:
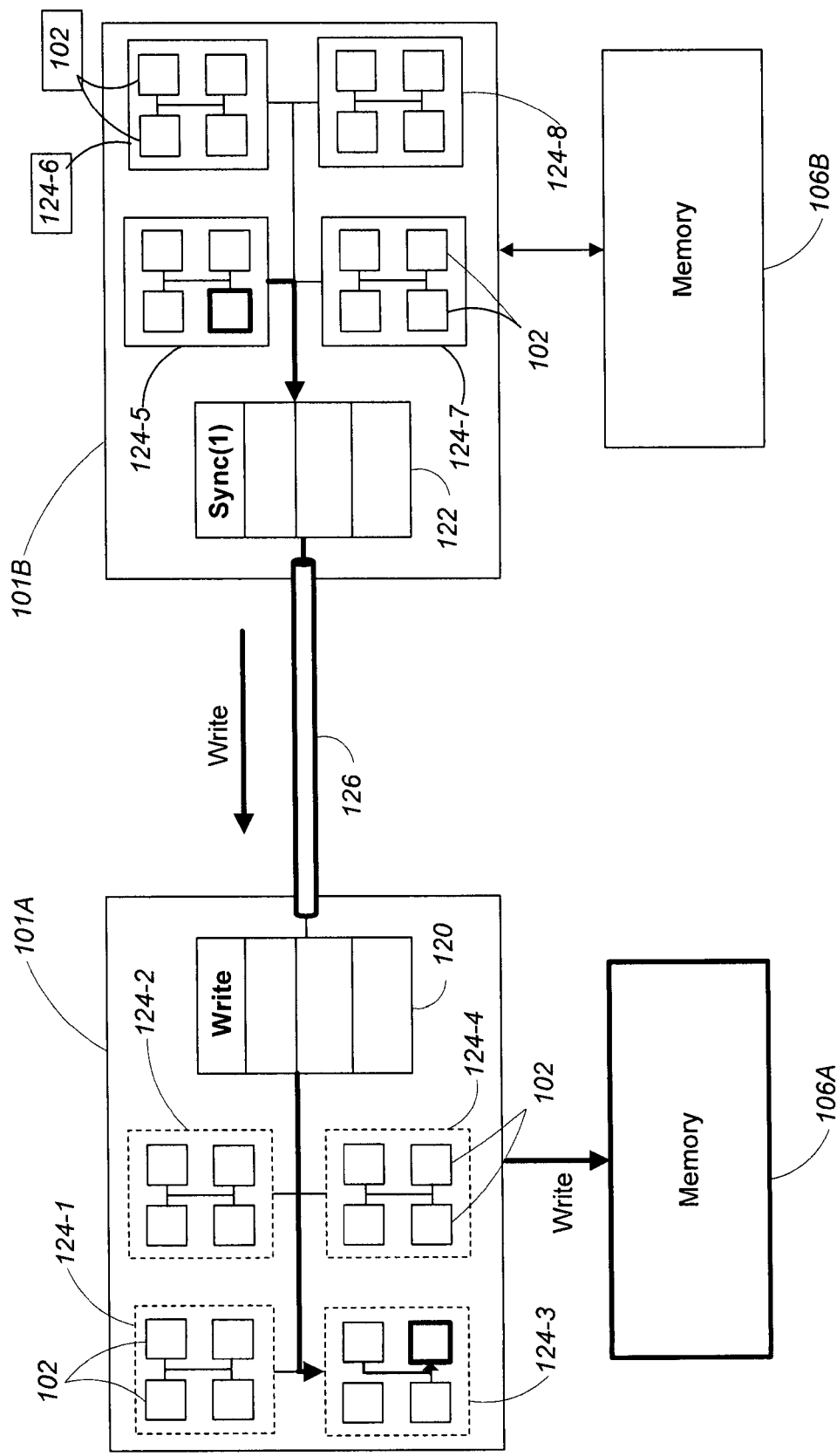
FIG. 4 shows a write message being sent over the communication channel.

Referring to FIG. 4, when the first synchronization message issues at the processing elements 102 of the subsets of processing elements in the second socket 101B, the first synchronization message causes the processing elements 102 to perform an operation to flush their write buffers. In the example of FIG. 4, flushing the write buffers of the processing elements causes one of the processing elements 102 of the fifth subset of processing elements 124-5 to send a write memory message to a processing element of the third subset of processing elements 124-3. The write memory message is added to the first message buffer 120 and is sent to the appropriate processing element of the third subset of processing elements 124-3. The first synchronization operation must receive an acknowledgement message from the processing element of the third subset of processing elements 124-3 (via the communication channel 126) before it can complete.

Figure 5:
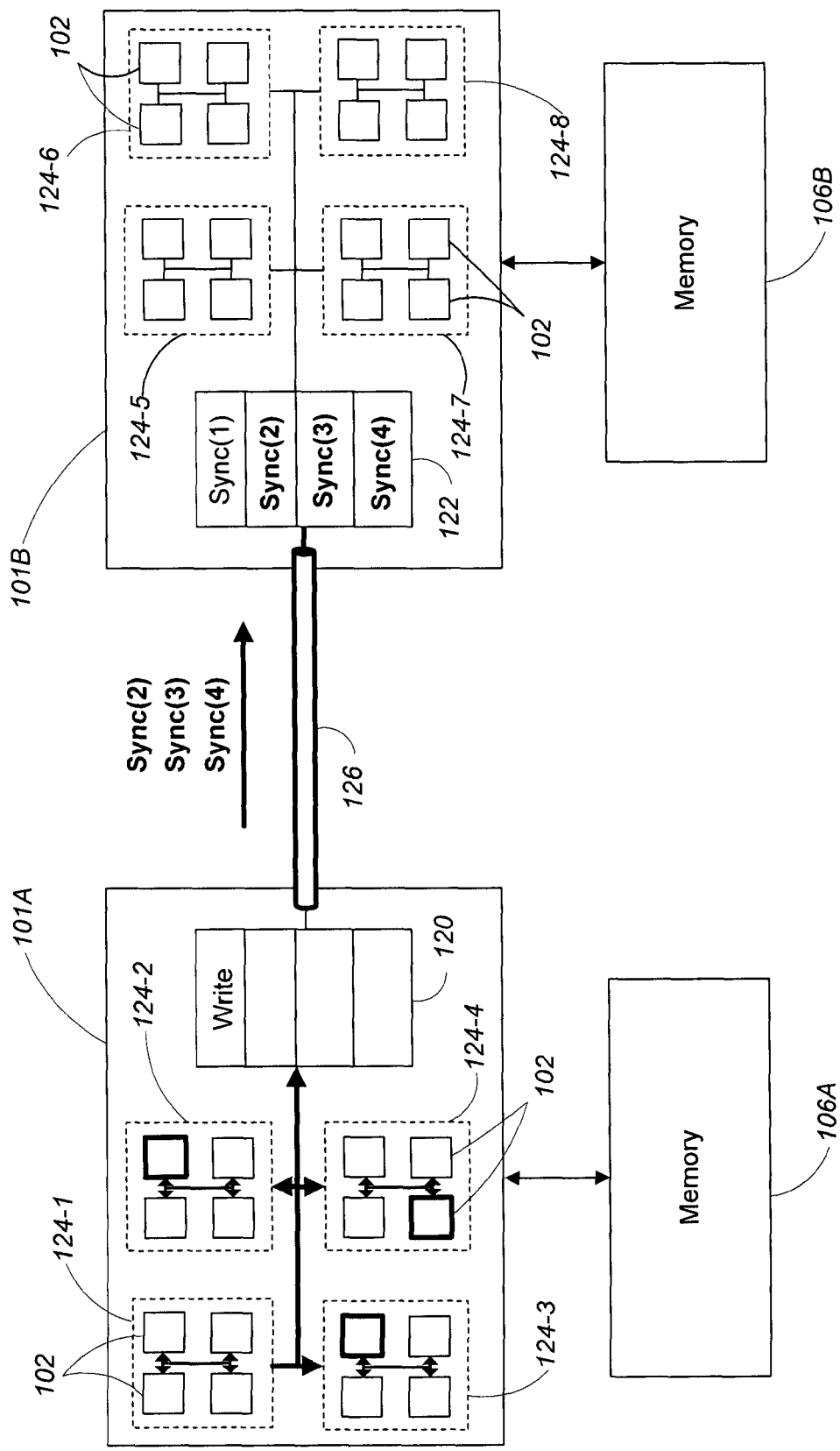
FIG. 5 shows second, third, and fourth synchronization messages being sent over the communication channel.

Referring to FIG. 5, while the first synchronization operation is waiting to receive an acknowledgement message from the first processing element of the third subset of processing elements 124-3, second, third, and fourth synchronization messages, Sync(2), Sync(3), Sync(4) are issued by processing elements in the second subset of processing elements 124-2, the third subset of processing elements 124-3, and the fourth subset of processing elements 124-4, respectively. The second, third, and fourth synchronization messages are sent over the communication channel 126 to the second socket 101B. At the second socket 101B, the second, third, and fourth synchronization messages are added to the second message buffer 122, completely filling the slots of the second message buffer 122.

Figure 6:
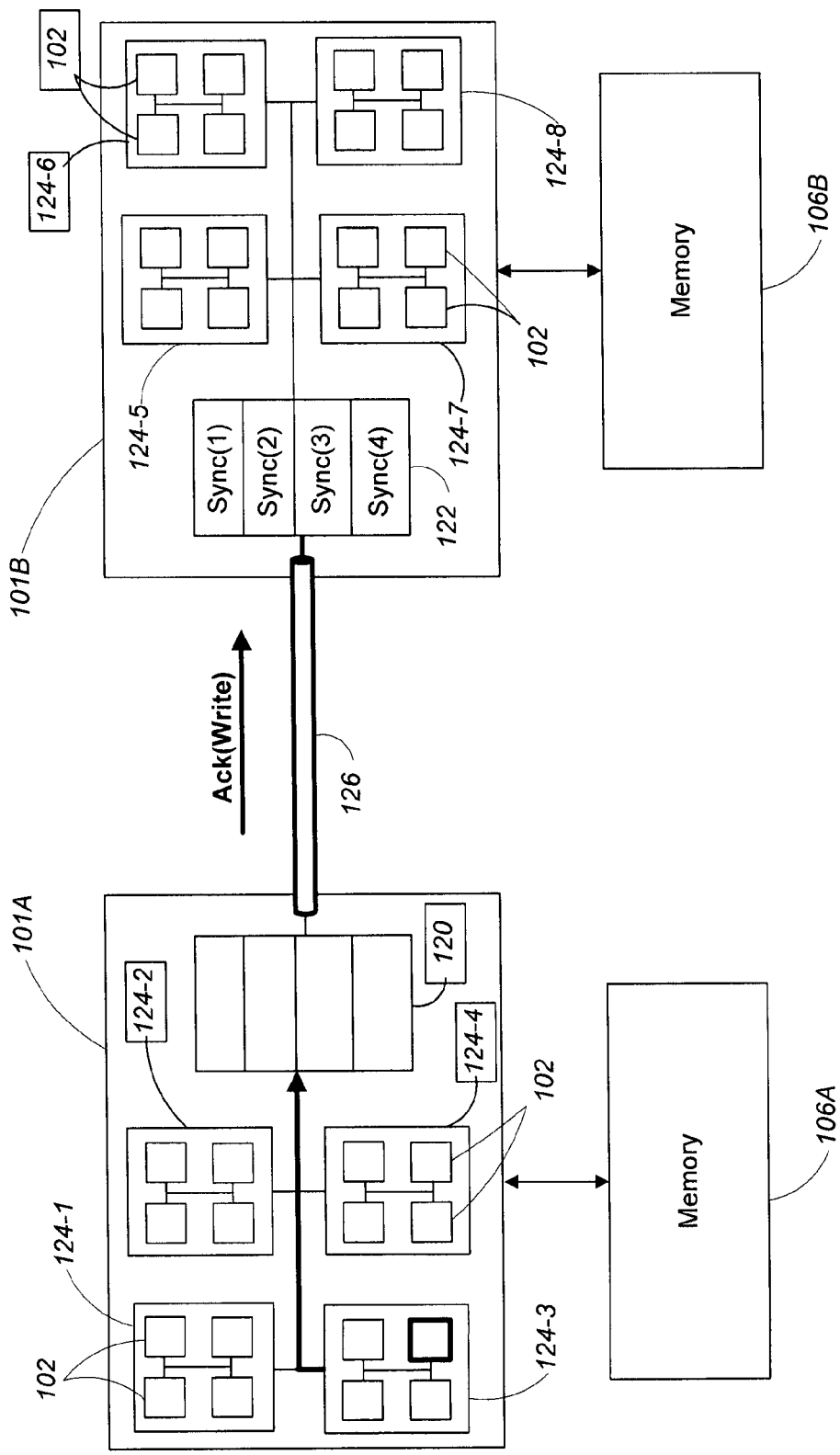
FIG. 6 shows a deadlock on the communication channel.

Referring to FIG. 6, when the processing element of the third subset of processing elements 124-3 completes the write operation, the write message is removed from the first message buffer 120 and an acknowledgement message, Ack(Write), is sent over the communication channel 126 to the second socket 101B.

As is evident in the figure, there is no free slot for the Ack(Write) message to occupy. However, a slot will only be freed after the first synchronization command, which requires the Ack(Write) message to arrive in the second message buffer 122 to finish, finishes. The communication channel 126 in FIG. 6 deadlocked.

2 Deadlock Avoidance

In some examples, to avoid deadlocks such as the one described above, a limit is placed on a number of synchronization messages originating from a given socket that can be outstanding in the message buffers of other sockets. In some examples, the limit is based on one or more of a number of processing elements in each subset of processing elements, a number of subsets of processing elements in each socket, and a number of sockets in the computing system. Then, the buffers for each of the sockets are designed to have a number of slots that is greater than the sum of the synchronization message limit for each of the other sockets. By designing the buffers for each of the sockets to have a number of slots that is greater than the sum of the synchronization message limit for each of the other sockets, there is a guarantee that there will always be a slot that is not occupied by a synchronization message.

Figure 7:
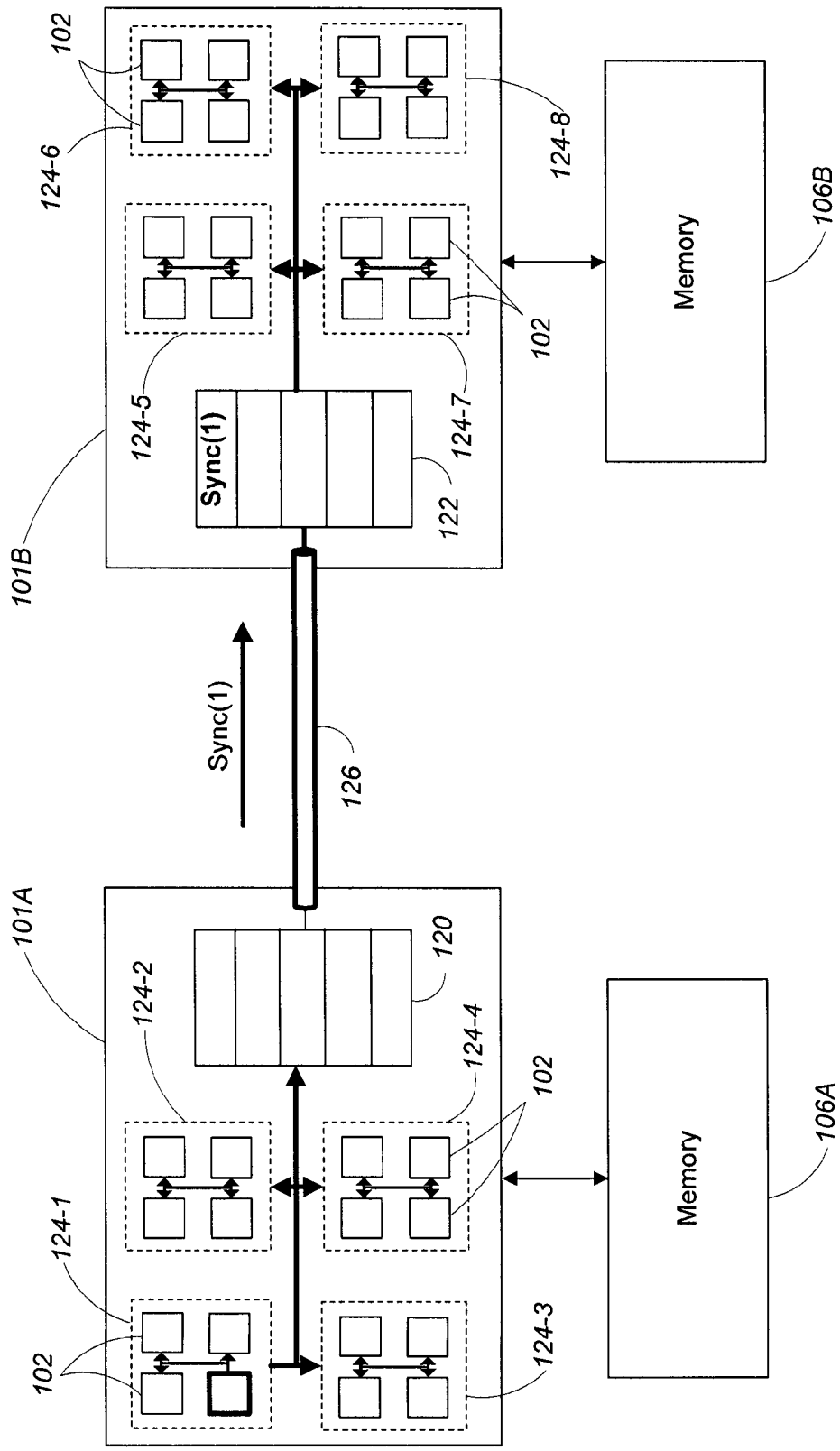
FIG. 7 shows a first synchronization message being sent over the communication channel.

Referring to FIG. 7, each of the sockets has four subsets of processing elements. Thus, to guarantee that no deadlock will occur, the first message buffer 120 and the second message buffer 122 both include five message slots (which in this example is one greater than the limit of synchronization messages that are allowed to occupy a slot in either of the message buffers 120, 122). Note that if another identical socket (and integrated processing circuit) were added, each of the message buffers would need to have nine or more slots to avoid deadlock.

In FIG. 7, a processing element 102 of the first subset of processing elements 124-1 sends a first synchronization message, Sync(1), to all of the processing elements 102 in the subsets of processing elements in the first socket 101A. The first synchronization message is also sent over the communication channel 126 to the second socket 101B. At the second socket 101B, the first synchronization message is added to the second message buffer 122 and is sent to the processing elements 102 of the subsets of processing elements in the second socket 101B.

Figure 8:
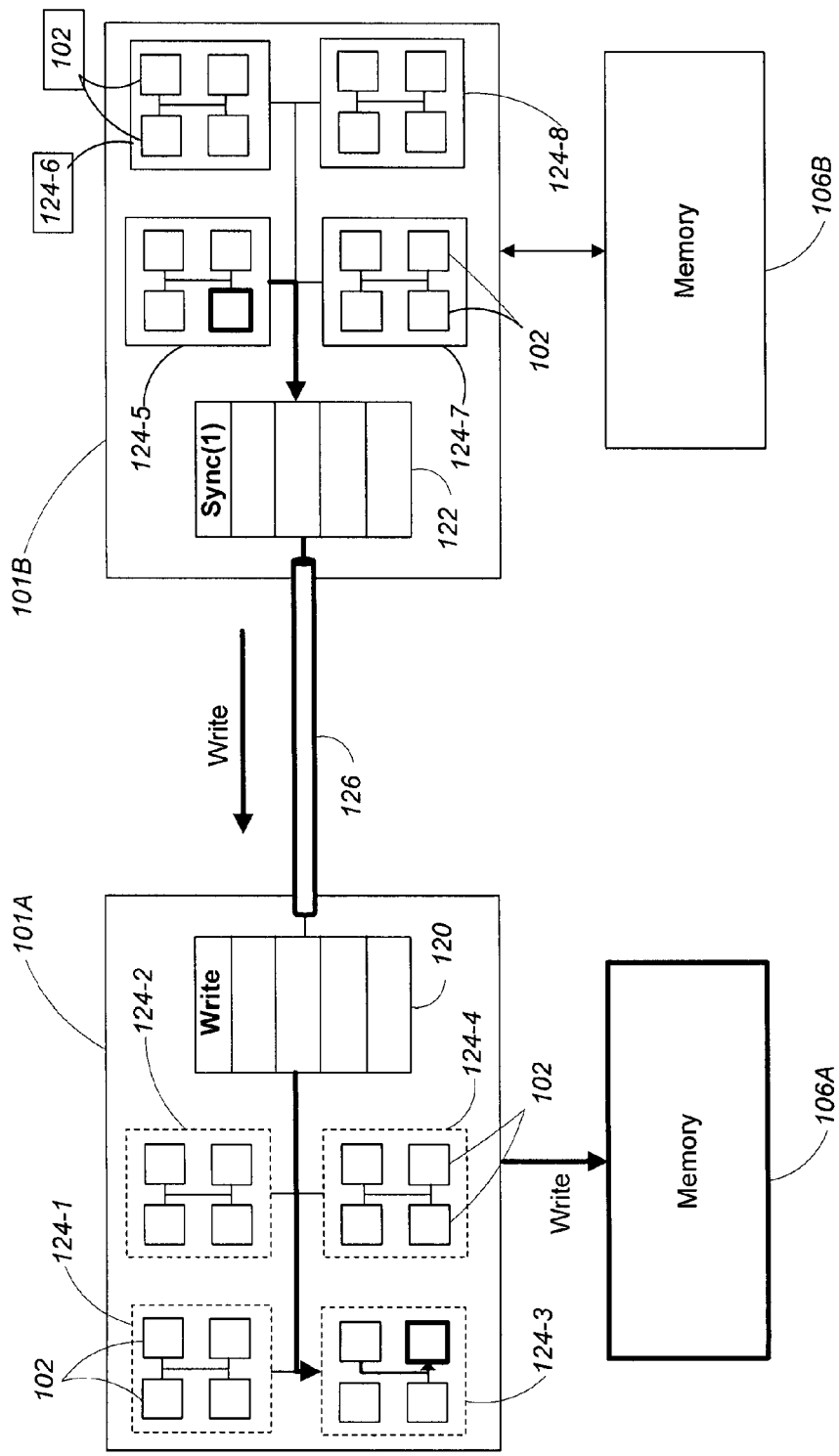
FIG. 8 shows a write message being sent over the communication channel.

Referring to FIG. 8, when the first synchronization message issues at the processing elements 102 of the subsets of processing elements in the second socket 101B, the first synchronization message causes the processing elements 102 to perform an operation to flush their write buffers. In the example of FIG. 8, flushing the write buffers of the processing elements causes one of the processing elements 102 of the fifth subset of processing elements 124-5 to send a write memory message to a processing element of the third subset of processing elements 124-3. The write memory message is added to the first message buffer 120 and is sent to the appropriate processing element of the third subset of processing elements 124-3. The first synchronization operation must receive an acknowledgement message from the processing element of the third subset of processing elements 124-3 (via the communication channel 126) before it can complete.

Figure 9:
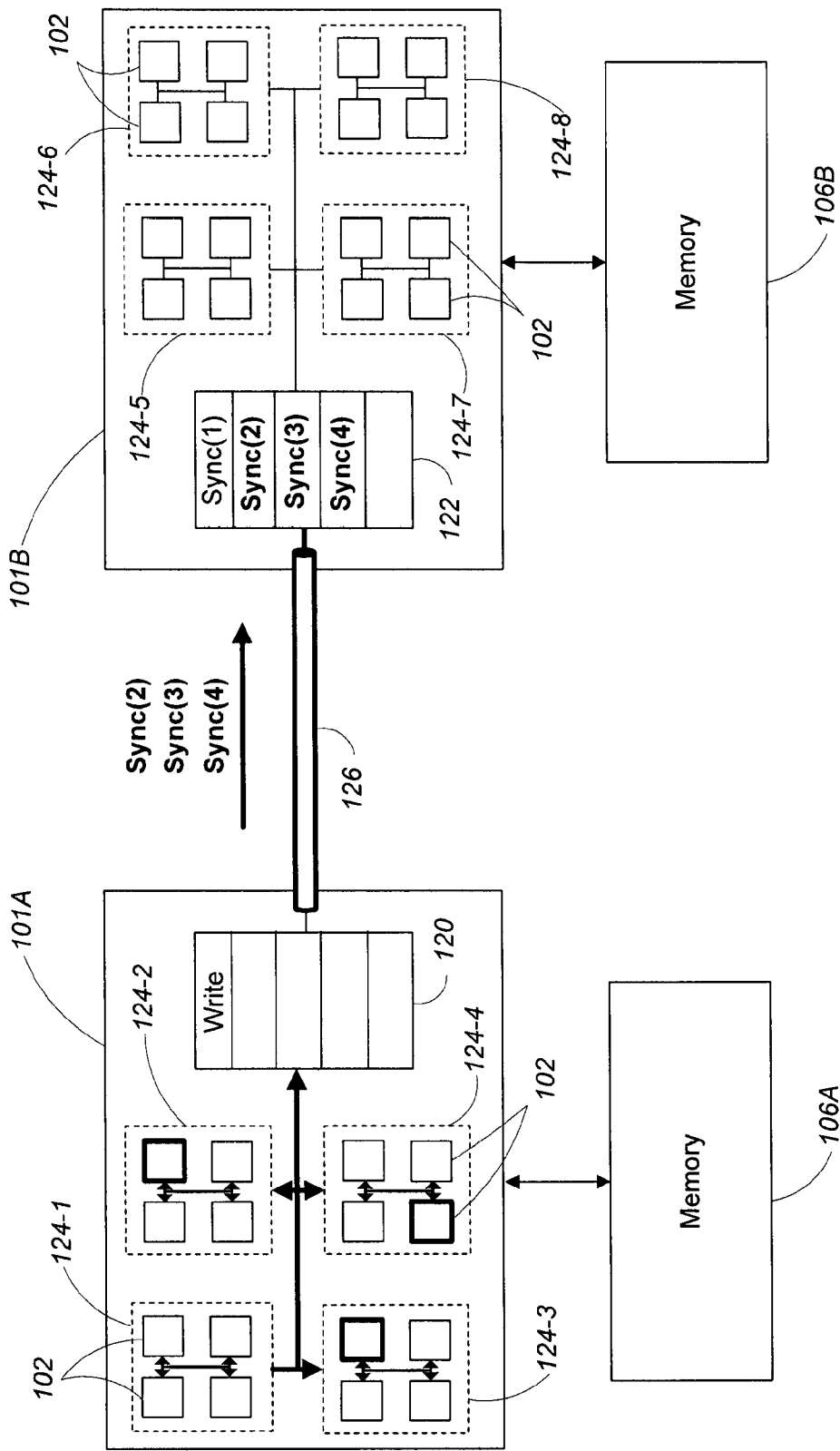
FIG. 9 shows second, third, and fourth synchronization messages being sent over the communication channel.

Referring to FIG. 9, while the first synchronization operation is waiting to receive an acknowledgement message from the first processing element of the third subset of processing elements 124-3, second, third, and fourth synchronization messages, Sync(2), Sync(3), Sync(4) are issued by processing elements in the second subset of processing elements 124-2, the third subset of processing elements 124-3, and the fourth subset of processing elements 124-4, respectively. The second, third, and fourth synchronization messages are sent over the communication channel 126 to the second socket 101B. At the second socket 101B, the second, third, and fourth synchronization messages are added to the second message buffer 122, filling all but one of the slots of the second message buffer 122.

Figure 10:
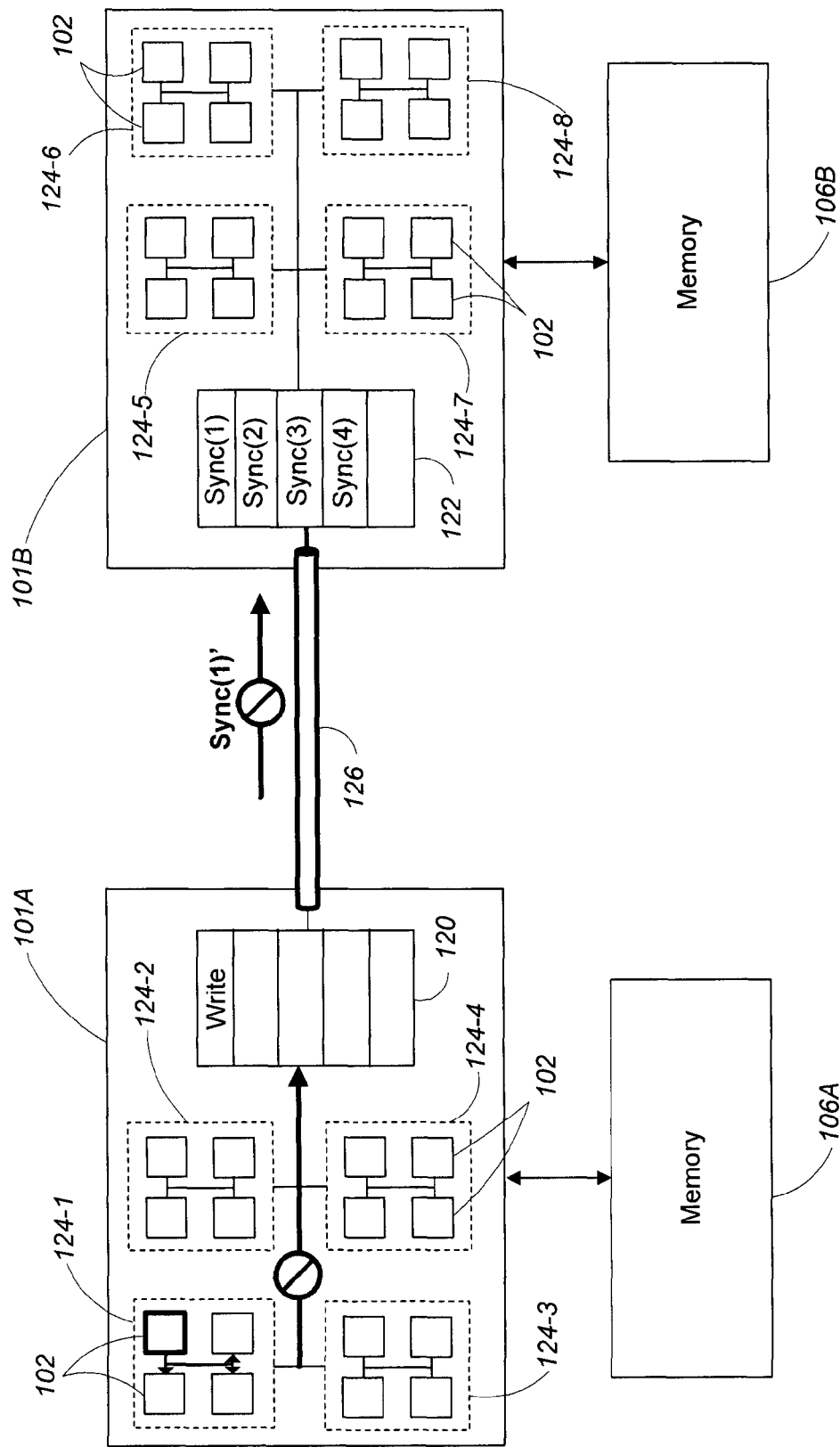
FIG. 10 shows a fifth synchronization message being suppressed.

Referring to FIG. 10, another processing element 102 of the first subset of processing elements 124-1 attempts to send a fifth synchronization message, Sync(1)', to the second socket 101B over the communication channel 126. However, in the example of FIG. 10, there can be only four synchronization messages originating from the first socket 101A in the second message buffer 122 at any given time (e.g., one synchronization message per subset of processing elements). Since there are already four synchronization messages from the first socket 101A occupying slots in the second message buffer 122, the fifth synchronization message is suppressed and is not added to the final open slot in the second message buffer 122.

Figure 11:
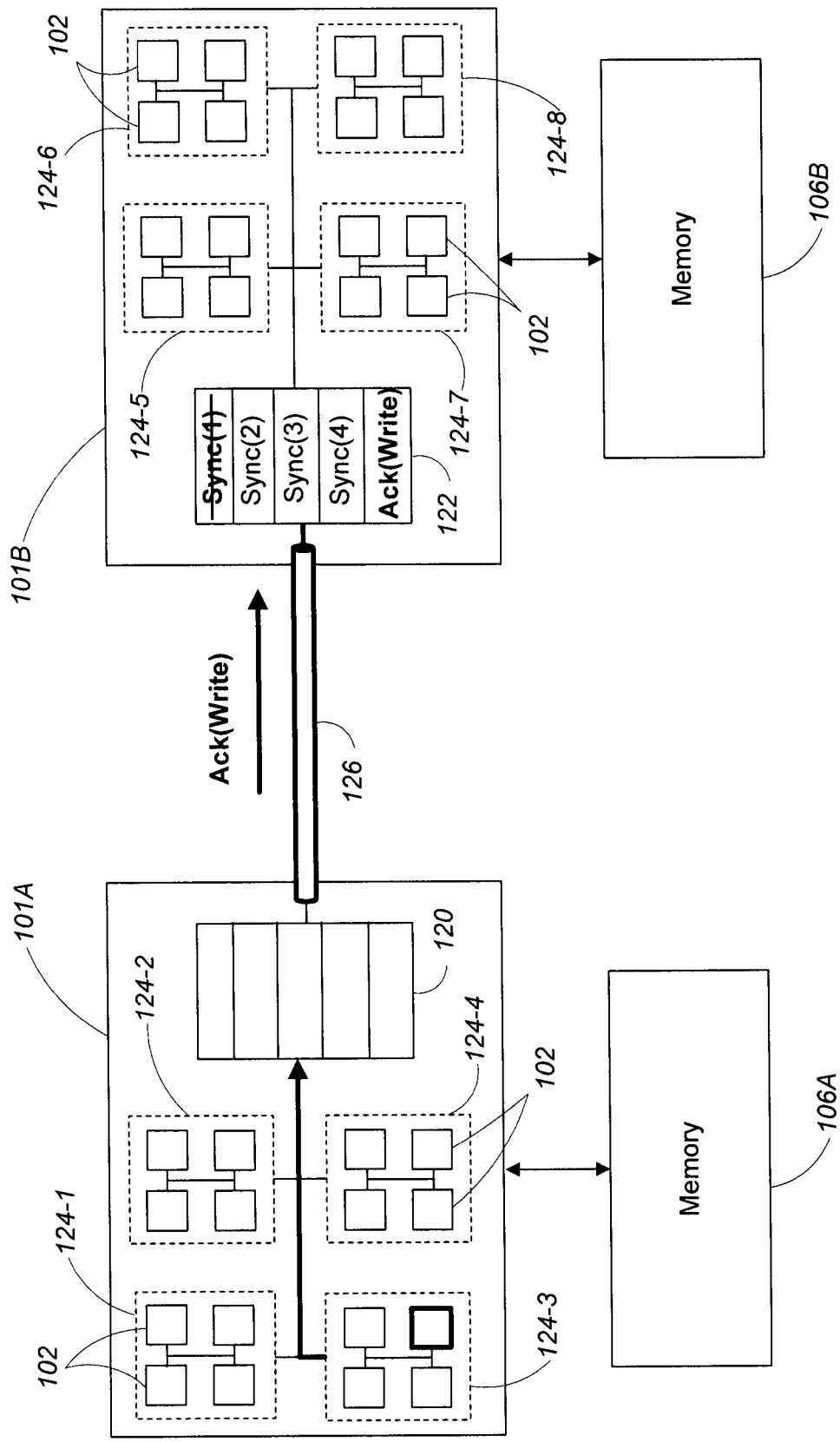
FIG. 11 shows a write acknowledgement message being sent over the communication channel.

Referring to FIG. 11, when the processing element of the third subset of processing elements 124-3 completes the write operation, the write message is removed from the first message buffer 120 and an acknowledgement message, Ack(Write), is sent over the communication channel 126 to the second socket 101B. The acknowledgement message is received in the last open slot in the second message buffer 122. The first synchronization message receives that acknowledgement message and completes its corresponding operation.

Figure 12:
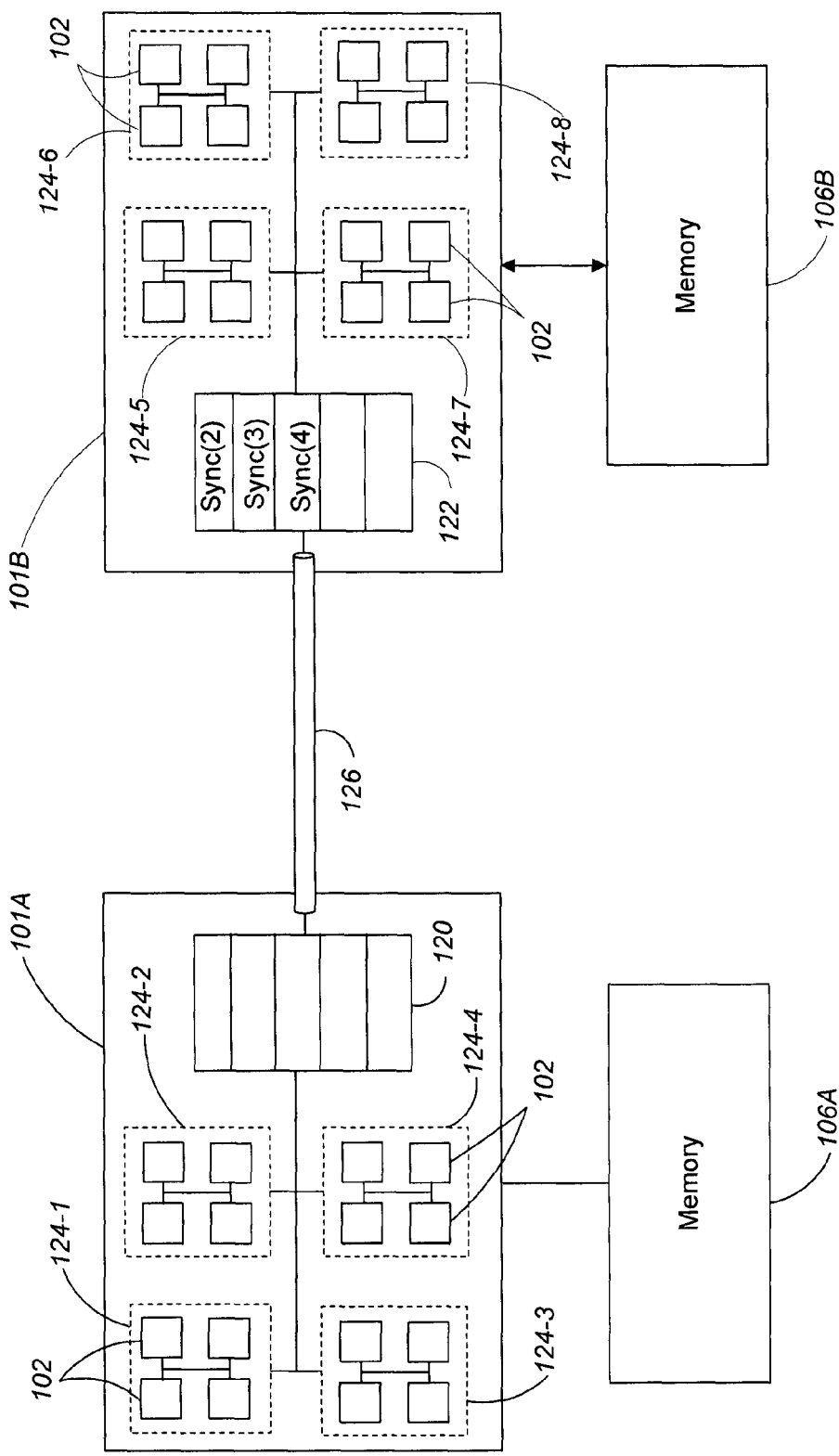
FIG. 12 shows that a deadlock was avoided.

Referring to FIG. 12, the first synchronization message and the acknowledgement message are removed from the second message buffer, allowing the second synchronization message to operate.

3 Alternatives

In some examples, message types other than synchronization messages and memory write messages can also benefit from the deadlock avoidance techniques described above.

In some examples, the synchronization message sends an acknowledgement back to its originating socket using another, separate channel than the communication channel described above.

In some examples, a translation lookaside buffer invalidation message for invalidation translation lookaside buffer entries can be sent over the communication channel. In some examples, translation lookaside buffer invalidation messages must be sent over the channel prior to the synchronization message.

In some examples, the translation lookaside buffer invalidation message also causes invalidation of one or more instruction cache entries.

In some examples, the communication channel described above is a virtual communication channel. In some examples three types of virtual communication channels exist: request, response, and forward.

In some examples, memory write messages are guaranteed to progress to completion. In some examples, synchronization messages are not guaranteed to progress to completion.

In some examples, the approaches described above are implemented on a motherboard including a number of sockets. In other examples, the approaches described above can be implemented as a system on a chip.

4 Implementations

Systems that implement the techniques described above can be implemented in software, in firmware, in digital electronic circuitry, or in computer hardware, or in combinations of them. The system can include a computer program product tangibly embodied in a machine-readable storage device for execution by a programmable processor, and method steps can be performed by a programmable processor executing a program of instructions to perform functions by operating on input data and generating output. The system can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

Other embodiments are within the scope of the following claims.

What is claimed is:

1. An apparatus comprising:
    a first set of multiple cores;
    a first buffer associated with the first set;
    a second set of multiple cores;
    a second buffer associated with the second set;
    communication circuitry configured to transfer messages from cores not in the first set to the first buffer, and to transfer messages from cores not in the second set to the second buffer; and
    wherein a first core of the first set is configured to send messages corresponding to multiple types of instructions to a second core of the second set through the communication circuitry, where at least one first type of instruction corresponds to a first operation that is performed by the second core without requiring any instructions to be transmitted through the communication circuitry to complete the first operation, and at least one second type of instruction corresponds to a second operation that is performed by the second core requiring at least one message to be transmitted through the communication circuitry to complete the second operation, the at least one message including an acknowledgement associated with an instruction of the first type, the instruction of the first type having been initiated in response to the second operation; and
    wherein the buffer of the second set is large enough to store a maximum number of instructions of the second type that are allowed to be outstanding from cores in the first set at the same time, and still have enough storage space for one or more instructions of the first type.

2. The apparatus of claim 1, wherein the first type of instruction includes a first instruction that corresponds to an operation that invalidates a virtual address stored in a translation lookaside buffer.

3. The apparatus of claim 2, wherein the first type of instruction includes a second instruction that corresponds to an operation that requests data to be written by a particular core.

4. The apparatus of claim 3, wherein the second instruction is performed for requesting that data, stored in one core and associated with a virtual address being invalidated, be written to a physical address by another core.

5. The apparatus of claim 3, wherein the second type of instruction includes a third instruction that requests acknowledgement from each core that previous messages corresponding to the first instruction have been completed.

6. The apparatus of claim 5, wherein completing at least one message corresponding to the first instruction requires sending at least one message corresponding to the second instruction.

7. A method for communicating among multiple sets of multiples cores, the method comprising:
    buffering messages in first buffer associated with a first set of multiple cores;
    buffering messages in a second buffer associated with a second set of multiple cores; and
    transferring messages over communication circuitry from cores not in the first set to the first buffer, and to transferring messages from cores not in the second set to the second buffer;
    wherein a first core of the first set sends messages corresponding to multiple types of instructions to a second core of the second set through the communication circuitry, where at least one first type of instruction corresponds to a first operation that is performed by the second core without requiring any instructions to be transmitted through the communication circuitry to complete the first operation, and at least one second type of instruction corresponds to a second operation that is performed by the second core requiring at least one message to be transmitted through the communication circuitry to complete the second operation, the at least one message including an acknowledgement associated with an instruction of the first type, the instruction of the first type having been initiated in response to the second operation; and
    wherein the second buffer is large enough to store a maximum number of instructions of the second type that are allowed to be outstanding from cores in the first set at the same time, and still have enough storage space for one or more instructions of the first type.

8. The method of claim 7, wherein the first type of instruction includes a first instruction that corresponds to an operation that invalidates a virtual address stored in a translation lookaside buffer.

9. The method of claim 8, wherein the first type of instruction includes a second instruction that corresponds to an operation that requests data to be written by a particular core.

10. The method of claim 9, wherein the second instruction is performed for requesting that data, stored in one core and associated with a virtual address being invalidated, be written to a physical address by another core.

11. The method of claim 9, wherein the second type of instruction includes a third instruction that requests acknowledgement from each core that previous messages corresponding to the first instruction have been completed.

12. The method of claim 11, wherein completing at least one message corresponding to the first instruction requires sending at least one message corresponding to the second instruction.

\* \* \* \* \*